United States Patent [19]
Kondo

[11] Patent Number: 4,889,015
[45] Date of Patent: Dec. 26, 1989

[54] AUTOMATIC TRANSMISSION CONTROL DEVICE

[75] Inventor: Shigeki Kondo, Hyogo, Japan

[73] Assignee: Mitsubishi Denki Kabushiki Kaisha, Tokyo, Japan

[21] Appl. No.: 213,859

[22] Filed: Jun. 30, 1988

[30] Foreign Application Priority Data

Jul. 2, 1987 [JP] Japan ............................. 62-16717487

[51] Int. Cl.$^4$ .............................................. B60K 41/18
[52] U.S. Cl. ...................................................... 74/866
[58] Field of Search .................. 74/866, 867, 863, 862; 364/424.1

[56] References Cited

U.S. PATENT DOCUMENTS

| | | | |
|---|---|---|---|
| 3,726,159 | 4/1973 | Mizote | 74/866 |
| 4,380,048 | 4/1983 | Kishi et al. | 74/866 |
| 4,584,906 | 4/1986 | Nagaoka et al. | 74/866 |
| 4,669,335 | 6/1987 | Matsuoka et al. | 74/866 |
| 4,693,225 | 9/1987 | Abe et al. | 74/866 X |
| 4,720,792 | 1/1988 | Kasai et al. | 74/866 X |
| 4,730,519 | 3/1988 | Nakamura et al. | 74/866 |
| 4,732,055 | 3/1988 | Tateno et al. | 74/866 |
| 4,733,581 | 3/1988 | Hasegawa et al. | 74/866 X |

*Primary Examiner*—Dirk Wright
*Attorney, Agent, or Firm*—Sughrue, Mion, Zinn, Macpeak and Seas

[57] ABSTRACT

A control device for an automatic transmission of a vehicle delays or reserves a switching from one shift pattern to another for a predetermined time when a gear change occurs at the time of the shift pattern switching. When a shift pattern is to be switched from one to the other while the vehicle is running at a certain speed range in the one shift pattern, the switching is reserved temporarily and, after it is shifted to the gear shift stage in the one shift pattern, the shift pattern switching to the other is performed.

1 Claim, 2 Drawing Sheets

AUTOMATIC TRANSMISSION CONTROL DEVICE

BACKGROUND OF THE INVENTION

The present invention relates to an automatic transmission control device and, particularly, to such a device which is capable of temporarily reserving or delaying the automatic switching of a gear change mechanism of the automatic transmission to either one of two shift patterns when the device decides the switching is not intended by an operator.

In a conventional electronically controlled automatic transmission, it is usual that the shift pattern which establishes the timing of gear shifts can be changed automatically or intentionally in order to match the shift pattern with a running mode desired by an operator or a change in the output characteristics of the engine. An example of such transmission is shown in Japanese Patent Publication No. 3981/1986.

In such an automatic transmission, there may be a gear change caused by the gear change mechanism thereof immediately after the shift pattern is switched from one to the other, while the accelerator pedal is not operated by an operator so that the vehicle speed is unchanged. That is, when the gear change mechanism of the automatic transmission is switched from a shift pattern covering a high speed range to a shift pattern covering a low speed range, a down-shift occurs, resulting in an undesired deceleration. This is particularily true when the switching between the shift patterns is performed automatically.

Since, in order to solve this problem, it is necessary to make respective shift patterns much closer to each other, it is very difficult to provide shift patterns having considerable mutual differences.

SUMMARY OF THE INVENTION

An object of the present invention is to provide a control device for an automatic transmission of a vehicle by which a smooth switching between shift patterns is realized automatically even if a current shift pattern is considerably different from a desired shift pattern to be switched to.

According to the present invention, means is provided for delaying or reserving a switching from one shift pattern to the other for a predetermined time when a gear change occurs at the time of the shift pattern switching.

In the present invention, when a shift pattern is to be switched from one to the other while a vehicle is running at a certain speed range in the one shift pattern, the shift of the gear change mechanism of an automatic transmission to the other shift pattern is reserved temporarily and, thereafter, the shift pattern switching to the other is performed.

DETAILED DESCRIPTION OF THE PREFERRED EMBODIMENT

Figure 1:
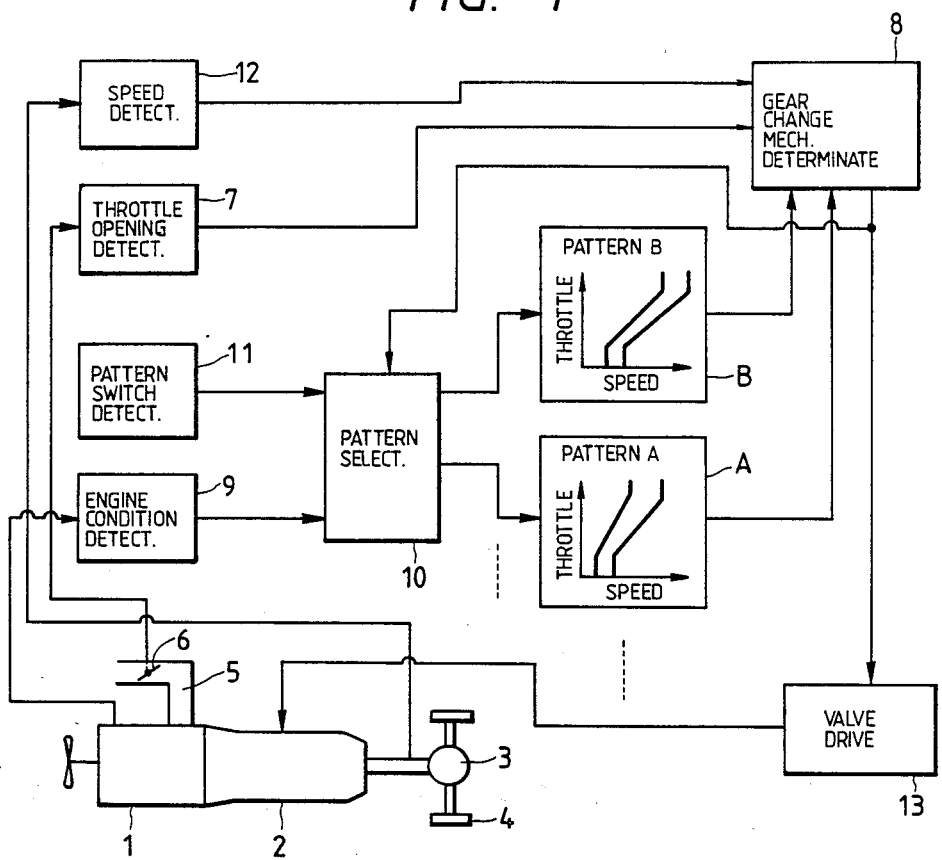
FIG. 1 is a block diagram of a control device of an automatic transmission according to an embodiment of the present invention.

In FIG. 1 which is a block diagram of an embodiment of the present invention, an engine 1 of a vehicle is coupled to an automatic transmission 2 which is coupled through a differential gear 3 to vehicle wheels 4.

A throttle valve 6 is arranged in a predetermined location in a suction tube 5 of the engine 1 and the opening thereof is detected by a throttle opening detector 7. The output of the throttle opening detector 7 is supplied to a gear change mechanism determination device 8.

The output characteristics of the engine 1 such as water temperature, etc., are detected by an engine characteristics detector 9 whose output is supplied to a shift pattern selector 1.

To the shift pattern selector 10, outputs of a shift pattern switching detector 11 and the gear change mechanism determination device 8 are also supplied, such that, when the output of the gear change mechanism determination device 8 is supplied to the shift pattern selector 10, the latter switches the shift pattern to a shift pattern A or B according to the output of either the shift pattern switching detector 11 or the engine characteristics detector 9 and sends the selected shift pattern to the gear change mechanism determination device 8 to which an output of a speed detector 12 is also supplied.

The speed detector 12 detects the vehicle speed from the rotation of the drive shaft between the automatic transmission 2 and the differential gear 3.

The gear change mechanism determination device 8 determines a gear change mechanism of the transmission working in the shift pattern A or B according to the output of the speed detector 12 and the throttle opening detector 7, and sends such determination to a valve driving device 13 for determination of gear change mechanism.

The valve driving device 13 responds to the output of the gear change mechanism determination device 8 to drive a gear change determining valve to switch the gear change step of the automatic transmission.

The operation of the present invention will be described with reference to FIG. 2, which shows the relationships between vehicle speeds and throttle openings for the respective shift patterns A and B including down-shift lines, together with FIG. 3 which shows a flow chart of operation.

Figure 2:
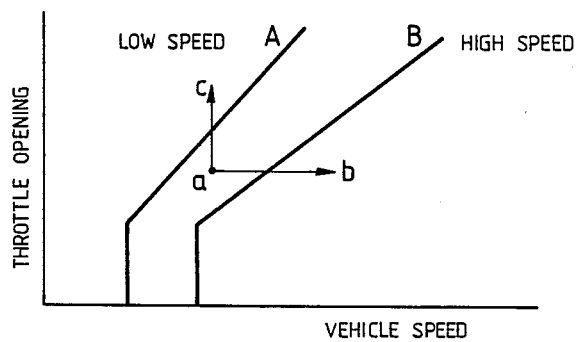
FIG. 2 is a graph showing a relation between a vehicle speed vs. throttle opening.
Figure 3:
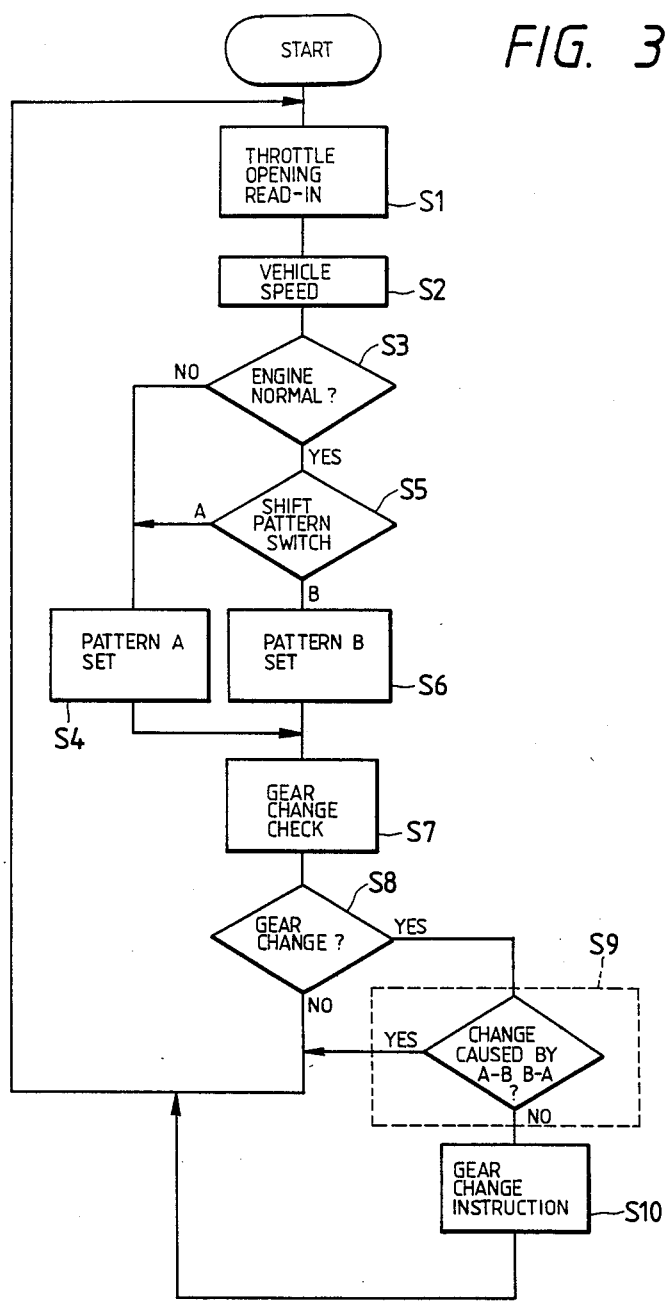
FIG. 3 is a flow chart showing an operation of the control device shown in FIG. 1.

It is assumed that the vehicle is running at a point a with the high speed shift pattern B (FIG. 2). In this condition, the throttle opening detector 7 detects the opening of the throttle valve 6 in step S1 (FIG. 3). In step S2, the speed detector 12 detects the vehicle speed and the gear change mechanism determination device 8 responds to the detected speed and the throttle opening to calculate a vehicle speed which is supplied to the gear change pattern selector 10.

The gear change pattern selector 10 determines whether or not the engine characteristics such as water temperature detected by the engine characteristics detector 9 are normal in step S3 and, if they are not normal, the gear change pattern selector 10 selects shift pattern A in step S4. Or, if they are normal and the shift pattern switch detector 11 detects that the speed pattern is switched to the shift pattern B in step S5, the shift pattern B is set in step S6. If the shift pattern switching detector 11 detects that the pattern is switched to the shift pattern A, the pattern A is set in step S4.

When the outputs of the speed detector 12 and the throttle opening detector 7 are supplied to the gear change mechanism determination device 8 and the output of the latter is supplied to the shift pattern selector 10, while the vehicle is running at point a, and when the shift pattern switching detector 11 detects that pattern A is switched to pattern B in step S5, the shift pattern selector 10 selects pattern B and sends the selection to the gear change mechanism determination device 8.

When the switch from pattern A to the pattern B is performed, the shift is checked in step S7. When a down shift is determined in step S8, such down shift is not actually implemented according to a decision performed in step S9.

In such case, the gear change mechanism determination device 8 determines an execution of the switching from pattern A to B after the vehicle speed has changed from point a to point b without down shift or after the vehicle speed has changed from point a to a point c in step S8, and the speed is shifted to the low speed step in pattern A by a down shift in step S9. And then it provides a speed change instruction to the valve driving device 13 to actuate it in step S10.

Thus, the valve drive device 13 drives the valve for the gear change mechanism determination to switch the gear change mechanism of the automatic transmission to the shift pattern B.

As described, according to the present invention, means is provided for delaying or reserving a switching from one shift pattern to the other for a predetermined time when a speed change occurs at a time of the shift pattern switching. When a shift pattern is to be switched from one to the other while a vehicle is running at a certain speed range in the one shift pattern, the switching is reserved temporarily and, after it is shifted to the gear shift stage in the one shift pattern, the shift pattern switching to the other is performed.

What is claimed is:

1. A control device for an automatic transmission (2) including a gear change mechanism having at least two speed shift patterns (A, B) and coupled to an engine (1) for automatically converting an output rotational speed of the engine to a driving rotational speed comprising: a vehicle running speed detector (12), a throttle opening detector (7), an engine characteristics detector (9), a gear change mechanism determination means (8) responsive to outputs of said running speed detector and said throttle opening detector, as gear shift pattern switching detector (11) for detecting a switching between said gear shift patterns and providing a switching output signal when a gear shift pattern switching occurs, and a gear shift pattern selector (10) responsive to outputs of said gear shift pattern switching detector and said engine characteristics detector, wherein said gear change mechanism determination means is responsive to the switching output signal from said gear shift pattern switching detector or an output of said engine characteristics detector to: (a) cause said shift pattern selector to select either one of said shift patterns as a next shift pattern according to the outputs of said throttle opening detector and said speed detector, (b) use a preceding one of said shift patterns before said gear change mechanism of said automatic transmission is switched to the next shift pattern to thereby temporarily delay a gear change and, (c) thereafter, to switch said gear change mechanism to said next shift pattern.

* * * * *